//  # 3,054,045
United States Patent Office
Patented Sept. 11, 1962

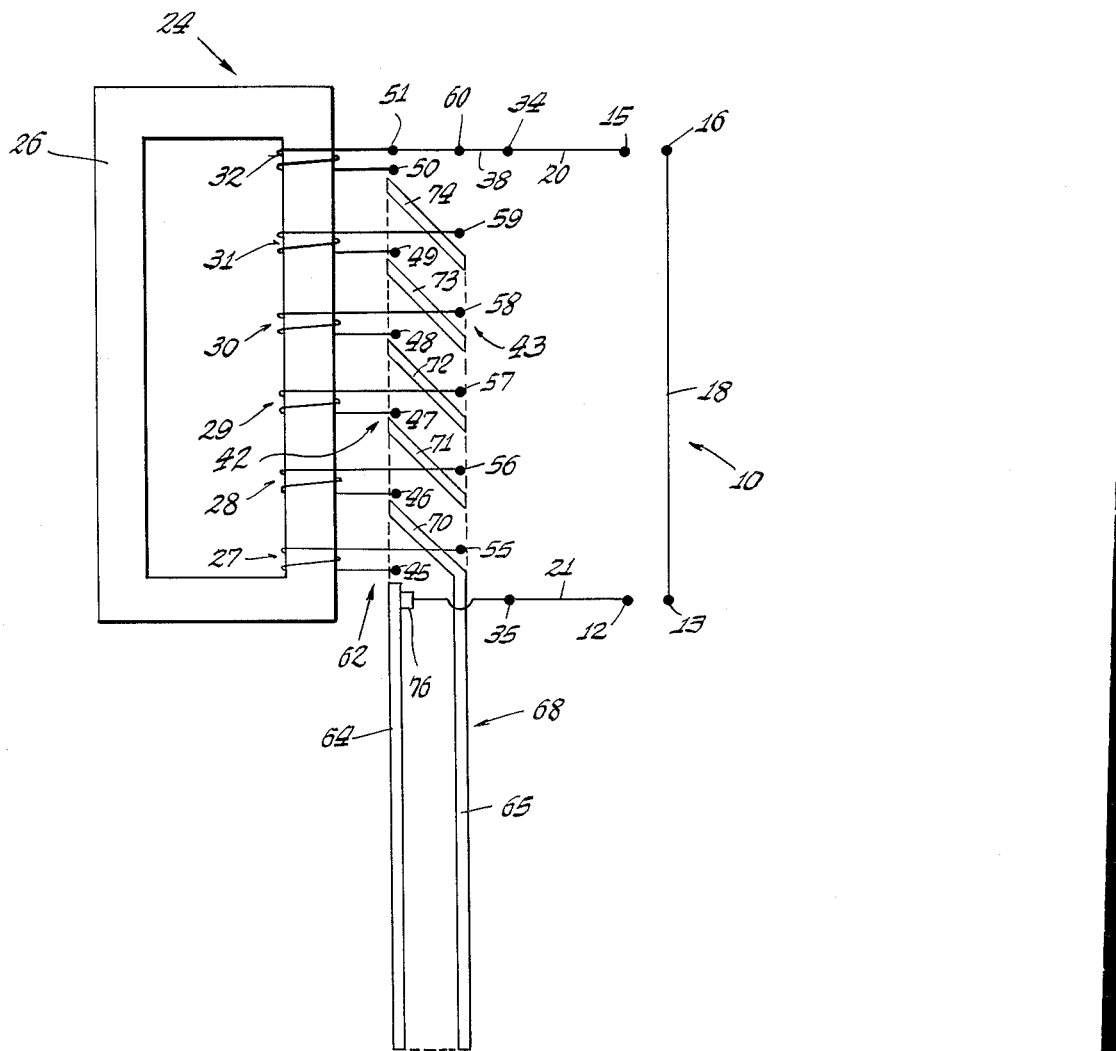

---

3,054,045
ELECTRICAL REGULATOR
Max A. Hershler, Great Neck, N.Y., assignor to Abraham Hershler, Great Neck, and Sigmund Chessid, Baldwin, N.Y.
Filed Nov. 21, 1958, Ser. No. 775,407
6 Claims. (Cl. 323—91)

This invention relates to electrical regulator devices, and more particularly to devices of the variable impedance type employing coils and a magnetic core means, which coils are arranged for insertion in a load circuit to control the load current.

An object of the invention is to provide a novel and improved electrical regulator in the form of a variable impedance device arranged for series connection in a circuit, which device is especially characterized by a minimum amount of energy or power loss.

A further object of the invention is to provide an improved regulator in the form of a variable impedance device as above set forth, wherein the copper losses are held to an absolute minimum.

A still further object of the invention is to provide an improved regulator-type variable impedance device, wherein a maximum amount of power may be handled and controlled with a minimum physical size of device.

A feature of the invention resides in the provision of a variable-impedance type electrical regulator, in which the electrical and magnetic circuits constituting the device are of extremely simple construction and may be readily fabricated by well known manufacturing processes.

Another feature of the invention resides in the provision of an improved variable-impedance regulator employing switching of coils to effect the regulation, wherein the coils at no time are either inactive or else short circuited.

Yet another object of the invention is to provide an improved variable-impedance regulator by which the above outlined advantageous control characteristics are obtained, said regulator being constituted of a simple combination of electrical coils and magnetic circuit therefor together with electrical switching means.

Still another object of the invention is to provide in an electrical regulator a novel combination of switching means with impedance devices of the magnetic core type, which is characterized by a maximum degree of efficiency together with relatively small size considering the power which is to be handled and controlled.

A further feature of the invention resides in the provision of novel, simplified switching means in combination with a plurality of electrically independent coils wound on a magnetic core, for the purpose of providing a variable impedance characteristic.

Other features and advantages will hereinafter appear.

The single FIGURE of the drawings is a schematic-diagrammatic representation of a variable impedance type regulator as provided by the invention, connected in series with a load circuit the power of which is to be varied.

Referring to the single figure of the drawings, there is shown an energized load circuit indicated generally by the numeral 10, said circuit being supplied with electrical energy from a usual supply line as by means of line terminals 12 and 13. The electrical load for the circuit 10 may be of various types, as for example resistive loads in the form of electrical heaters, or lighting loads in the form of incandescent lamps, etc. The load may be connected with the circuit 10 by means of load terminals 15 and 16, the terminal 16 being connected by a wire or bus 18 to the line terminal 13, as shown.

Wires 20 and 21 are connected respectively to the load and line terminals 15 and 12 whereby a variable impedance may be inserted in the load circuit 10 through connection with the wires 20, 21 for the purpose of controlling the load current or the power of the load circuit.

By the present invention I provide a novel and improved, variable impedance type electrical regulator device 24 for connection with the wires 20, 21 to control the energy or power of the load circuit 10. The said regulator device is characterized by a very high degree of efficiency, with a minimum amount of loss, together with compactness and small size with relation to the power which is to be handled.

As shown, the electrical regulator device comprises a closed magnetic core 26 on which there is wound a plurality of coils numbered 27 through 32, there being shown specifically six of such coils. It will be understood however that either a greater or lesser number of coils may be provided on the core 26, depending on the type of regulation which is desired. By the present invention the individual coils 27-32 are all electrically independent of each other except that they may be interconnected by a novel switch means later to be described. Further, in accordance with the invention, the coils 27-32 are constituted respectively of wire of different and progressive sizes. That is, the coil 27 may have wire of a small size and the coil 32 wire of large size, with the wire sizes of the intermediate coils 28-31 varying progressively between the smallest and largest sizes. By such organization a maximum degree of efficiency with minimum losses is achieved, in the electrical regulator device, as will be brought out in detail below.

By the present invention the coils 27-32 constituted of windings of wire of different and progressive sizes are switched and interconnected in a novel and advantageous manner to effect a variable impedance characteristic in series with the load circuit 10, thereby to regulate the power or energy supplied to the load. To effect such connections a novel switch means is provided, connected with the said coils for connecting the same in a number of different ways whereby they are either all in series or all in parallel or else some only in a series string with the remainder in parallel respectively with one of the coils in the series string. Moreover, the number of different ways in which the coils are connected is equal to the number of the coils themselves. The interconnections between the coils 27-32 for obtaining the control, as effected by the switch means, may be stated in another way. That is, the coils may be connected either all in series or all in parallel, or else all in two groups, the groups being connected serially with each other and one group consitituting some of the coils all in parallel with each other while the other group consists of the remainder of the coils all in series with each other. In effecting such connections the switch means has progressive positions, one end position connecting the coils all in parallel, the other end position connecting the coils all in series, and intermediate switch positions in regular order effecting progressively more parallel coil circuits, or looking at it another way, progressively connecting fewer of the coils into the series group and more of the coils in the parallel group. Moreover, the last coil to remain in the series group during the progressive switching is wound with the thickest wire, and this would be the coil 32 shown in the figure. The coil which occurs the most number of times in the parallel group is wound with the thinnest wire, and this would be the coil 27 shown in the figure. The electrical regulator is shown as having two terminals numbered 34 and 35, said terminals being connected respectively to the wires as shown. Preferably, the coil 32 which has the thickest wire has one terminal which is permanently connected to the terminal 34 of the regulator, as by a wire 38.

It is further preferred that the coils 27-32 all have an equal number of turns, and that the total length of wire which is employed in winding each coil is fixed, or the same. That is, a certain number of feet of wire may be used to wind the coil 27, an equal number of feet of a thicker wire used to wind the coil 28, an equal number of feet of a still thicker wire used for the coil 29 and so on, and in each instance the number of turns for the coils is held to the same value. The core 26 may be especially arranged to permit coils having the above characteristics to be economically and practically arranged with regard to the magnetic circuit, and the core 26 may be of laminated construction as is usual with alternating current electrical apparatus, or it may be of other construction especially designed to hold to a minimum hysteresis and eddy current losses. These losses, together with the copper loss in the windings, represent the entire loss of the induction regulator, and by the present invention the copper losses are held to an absolute minimum by the particular arrangement and construction of the coils as above set forth, together with the switching arrangement provided by the invention, wherein at no time is any coil not energized, nor at any time is there a short circuit condition existing in the regulator device.

Considering now the switching means by which the coils 27–32 are interconnected in the above particular manner, it should be understood that there is illustrated herein one specific embodiment of switch, but that the invention is not limited to the particular switch structure shown but instead embraces the use of various types of switches to effect the specified connections.

As shown, each of the coils 27–32 has its ends connected to individual contacts contained in two banks of contacts 42 and 43. Where six coils 27–32 are provided, as shown, each of the banks of contacts 42, 43 would have six regularly arranged individual and separate contacts, and the contacts of one bank would be connected respectively to corresponding ends of the coils 27–32, whereas the individual contacts of the other bank would be connected to the other corresponding ends of the coils 27–32. In the drawing, the bank 42 is shown as having regularly arranged contacts which are numbered 45 through 50 and the bank 43 is shown as having regularly arranged contacts which are numbered 55 through 60 respectively.

The switch means, indicated generally by the numeral 62, further has a movable assembly comprising a pair of contact bars or rails 64, 65, the bar 64 having a sufficient length and being longitudinally movable in a manner to enable it to connect together or short circuit all of the contacts 45–50 of the bank 42. The same is true of the bar 65 with respect to the contacts 55–60 of the bank 43. Thus, it will be understood that the movable part or operator of the switch 62, which operator is indicated generally by the numeral 68, may be shifted upward from the lowermost position shown in the figure wherein it does not engage any of the contacts of the banks, and during its progressive movement the switch operator will effect an interconnection progressively of the contacts of the banks, until finally, when the operator 68 is in its uppermost position all of the contacts 55–60 of the bank 43 will be interconnected or short circuited with each other, the same being true of the contacts 45–50 of the bank 42 but with the addition of a seventh contact 51 connected to the wire 38. For such uppermost position of the operator 68 it will now be apparent that a direct connection will exist through the bar 64 between the wires 20 and 21 to obtain full load current, and that for the switch position immediately preceding this, where the contact 51 is not engaged but the contact 50 is, all of the coils 27–32 will be connected in parallel and the said parallel network will be inserted in series in the load circuit, providing a minimum value of inserted impedance therein and resulting in a slightly less than maximum load current.

The movable switch operator 68 also has a plurality of angularly disposed contact segments numbered 70 through 74, said segments being so arranged that they can simultaneously interconnect certain contacts of the bank 42 with other contacts of the bank 43.

Considering the illustration, with the switch operator in the lowermost position shown it does not connect to any of the contacts of the banks 42 and 43, and therefore the load circuit is open by virtue of the contact bar or rail 64 being isolated. It will be observed that such contact rail is always permanently connected with the terminal 35 of the regulator, as by means of a suitable brush or shoe 76, as indicated.

When the switch operator 68 is raised a slight distance to cause the rail 64 to engage the switch contact 45, the contacts 55 and 46 will be connected by means of the diagonal connector 70, the contacts 56 and 47 will be connected together by the contactor 71 and so on, and finally the switch contacts 59 and 50 will be connected together by the contactor 74. For such position of the switch 62 the coils 27–32 will all be connected in series and will be inserted in series in the load circuit 10, and this represents one operative, regulating end position of the switch means as specified in the appended claims. The other operative regulating end position of the switch means, where all of the coils 27–32 are connected in parallel, occurs when the switch operator 68 is in position just below its uppermost position, with the bars or rails 64, 65 respectively bridging all of the contacts of the banks 42, 43 except the contact 51.

After the switch operator 68 has been lifted upward slightly to engage the rail 64 with the first contact 45, considering the next progressive position an additional upward movement of the switch operator 68 will bring the rail 64 in engagement with both of the contacts 45 and 46 of the bank 42. Upon this occurring, the bridging contactor 70 will connect the contacts 56 and 47 together, the contactor 71 will connect the contacts 57 and 48 together and so on. For such position of the switch the coils 27 and 28 will be connected in parallel with each other, whereas the coils 29–32 will all be in series. Also, the parallel network comprising the coils 27 and 28 will be serially connected with the series coils 29–32, and the entire assemblage will be connected in series with the load circuit 10. Another way of looking at the connections as thus effected by the switch 62 is as follows. The coil 27 may be considered as connected in a string with the series coils 29, 30, 31 and 32, and the only remaining coil 28 may be considered as in parallel with the coil 27 which constitutes a portion of the series string, so to speak. For the next succeeding position of the switch operator 68 the coils 27, 28 and 29 will all be connected in parallel, whereas the coils 30, 31 and 32 will be connected in series with each other. Also, the parallel groups as a unit will be connected in series with the series groups, and the entire assemblage will be connected in series in the load circuit 10. For this connection it may be considered that the series is formed by the coils 27, 30, 31 and 32, and the coils 28 and 29 will be connected in parallel with the coil 27 of the said series string.

When the switch 62 connects all of the coils 27–32 in series the maximum impedance is inserted in the load circuit 10, and as the switch operator 68 is progressively moved upward less and less impedance will be inserted in the load circuit, until the minimum impedance control condition is arrived at with all of the coils in parallel with each other.

It will now be understood that by making the coil 32 with the thickest wire, the coil 31 with the next thickest wire and so on, ending with the coil 27 having the thinnest wire, the minimum amount of copper loss occurs for all of the different settings of the switch 62. Thus, the induction regulator may have a relatively small size as compared with the power that it handles, and will operate at a maximum efficiency for all switch settings.

It will be noted that where it is desired to have full power in the load circuit without any reduction being effected by the induction regulator, the contact 51 in the bank 42 comes into use, being engaged by the bar 64 when the switch operator 68 is in its fully raised position. A direct circuit is therefore established through the switch 62, between the terminals 34 and 35 of the regulator, and the coils 27–32 are not utilized at all. One hundred percent power is therefore transmitted through the switch 62, except for slight contact losses.

An advantageous application of the present improved induction regulator is to provide variable lighting intensity for rooms, especially in connection with ceiling fixtures and lamps. The induction regulator could be made to replace wall switches, for example, without any change in the house wiring.

Variations and modifications may be made within the scope of the claims, and portions of the improvements may be used without others.

I claim:

1. An alternating current power-controlling electrical regulator device comprising a magnetic core; a plurality of separate, electrically distinct and unconnected coils at least three in number, disposed on said core and constituted respectively of wire of different and progressive sizes; and switch means connected with said coils for consecutively connecting the same, without effecting a short circuit of any coil, in a number of different ways to effect a graduated increase or else a graduated decrease in impedance by joining the coils either all in series or all in a series-parallel circuit wherein the coil with the thickest wire is in series and the coil with the thinnest wire is paralleled to a coil other than the thickest-wire coil, or else all in parallel, said switching means at all times connecting the coils to be all in phase with each other.

2. An alternating current power-controlling electrical regulator device comprising a magnetic core; a plurality of separate, electrically distinct and unconnected coils at least three in number, disposed on said core and constituted respectively of wire of different and progressive sizes; and switch means connected with said coils for connecting the same, without effecting a short-circuit of any coil, in a number of different ways, to effect a graduated increase or else a graduated decrease in impedance by joining the coils either all in series or all in two groups the groups being connected serially with each other, one group consisting of some of the coils all in parallel and the other group consisting of the remainder of the coils in series, or else all in parallel, said switching means at all times connecting the coils to be all in phase with each other.

3. An alternating current power-controlling electrical regulator device comprising a magnetic core; a plurality of separate, electrically distinct and unconnected coils at least three in number, disposed on said core and constituted respectively of wire of different and progressive sizes; and switch means connected with said coils for connecting the same, without effecting a short circuit of any coil, either all in series or all in two groups the groups being connected serially with each other, one group consisting of some of the coils all in parallel and the other group consisting of the remainder of the coils in series or else all in parallel, said switching means at all times connecting the coils to be all in phase with each other, said coils being independent of permanent interconnections between them and said switch means having two banks of contacts connected to one terminal or the other terminal of each of said coils.

4. The invention as defined in claim 2 in which the length of wire in each coil is equal to that of each of the other coils.

5. In combination, an energized alternating-current electrical power-controlling load circuit; and an electrical regulator device connected in series in said circuit and comprising a magnetic core; and constituted respectively of wire of different and progressive sizes; and switch means connected with said coils for connecting the same, without effecting a short-circuit of any coil, in a number of different ways to effect a graduated increase or else a graduated decrease in impedance by joining the coils either all in series with each other or all in two groups which are connected serially with each other, one group consisting of some of the coils in parallel with each other and the other group consisting of the remainder of the coils in series or else all in parallel, said switching means at all times connecting the coils to be all in phase with each other.

6. In combination, an energized alternating-current electrical power-controlling load circuit; and an electrical regulator device connected in series in said circuit and comprising a magnetic core; a plurality of separate, electrically distinct and unconnected coils at least three in number, disposed on said core and constituted respectively of wire of different and progressive sizes; and switch means connected with said coils for connecting the same without effecting a short-circuit of any coil, in a number of different ways either all in series with each other or all in two groups which are connected serially with each other, one group consisting of some of the coils in parallel with each other and the other group consisting of the remainder of the coils in series with each other, or else all in parallel, said switching means at all times connecting the coils to be all in phase with each other, one end of the load circuit being permanently connected to one end of the coil having the thickest wire and the said switch means being connected to another part of said load circuit.

References Cited in the file of this patent

UNITED STATES PATENTS

| 669,362 | Emmott | Mar. 5, 1901 |
| 1,831,886 | Ross | Nov. 17, 1931 |
| 1,895,096 | Doloukanoff | Jan. 24, 1933 |
| 1,961,874 | Frederiksen | June 5, 1934 |
| 2,735,979 | Coben | Feb. 21, 1956 |

FOREIGN PATENTS

| 257,334 | Great Britain | Aug. 27, 1926 |
| 592,657 | France | May 6, 1925 |